Nov. 17, 1931.    J. I. HULL    1,832,703

COMMUTATION OF MULTIPLEX ARMATURE WINDINGS

Filed Jan. 17, 1930

Inventor:
John I. Hull,
by Charles E. Tullar
His Attorney.

Patented Nov. 17, 1931

1,832,703

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

COMMUTATION OF MULTIPLEX ARMATURE WINDINGS

Application filed January 17, 1930. Serial No. 421,537.

My invention relates to dynamo electric machines having commutated windings and the principal object of my invention is to improve the commutation of such machines.

In dynamo electric machines having commutated windings it frequently becomes desirable to improve commutation by having a lower value of induced voltage between adjacent commutator segments than that corresponding to one turn surrounding the entire working flux of the machine. With the commonly used plain multiple windings this is not possible except by the use of fractional pitch windings. Where low fractional pitch windings are used there are attendant evils such as greatly increased copper losses and a relatively increased importance of harmonic voltages compared to the fundamental voltages and these disadvantages strongly counteract any gains to commutation that might result from the use of such windings. It therefore became desirable to use full pitch or nearly full pitch windings and at the same time have a lower value of induced voltage between adjacent commutator segments than that corresponding to one turn surrounding the working flux of the machine. This desirable object is obtained by means well known to those skilled in the art, as shown for example in United States Letters Patent 1,739,445, Dreghorn, assigned to the assignee of this invention.

Figure 1:
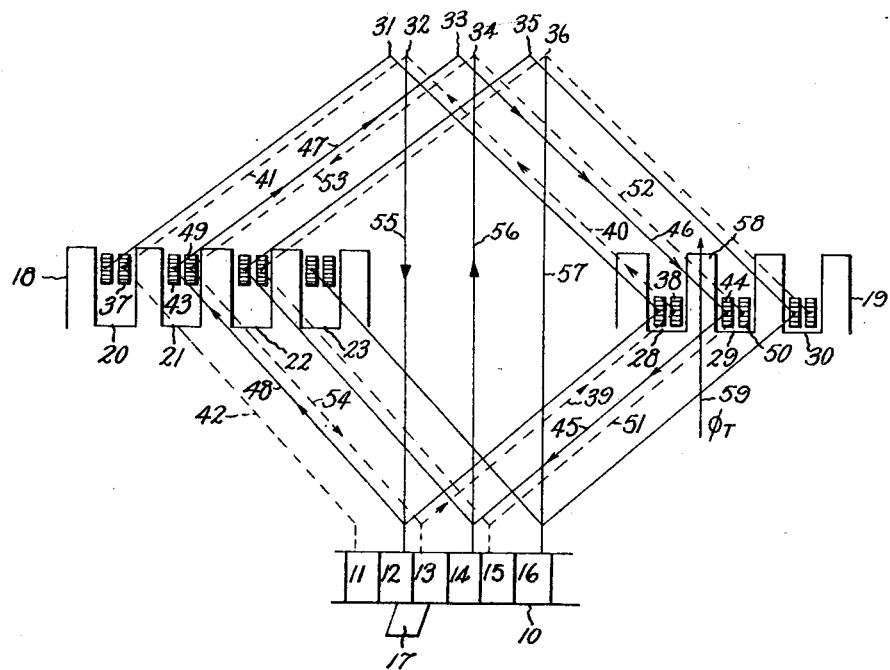
Figure 2:
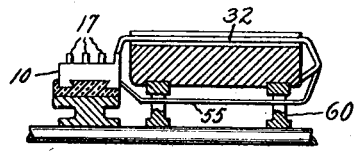

Fig. 1 of the above mentioned patent discloses an ordinary full pitch or nearly full pitch multiple winding in which the ends of each coil are connected to alternate commutator segments with the so-called equipotential leads connecting the intervening commutator segment to the middle point of the coil at the end of the armature opposite the commutator. Fig. 2 of the above mentioned patent is similar to Fig. 1 except that an additional winding is connected to the intervening commutator segments and the two windings are of unequal pitches and hence Fig. 2 discloses a duplex winding with equipotential leads. It is evident that in Figs. 1 and 2 the induced voltage between adjacent commutator segments will be one-half of the voltage induced in a coil and in addition there will be a uniform voltage gradient between adjacent commutator segments although this may be accompanied by a slight flow of equalizing current in the equipotential leads. It is evident that the induced voltage between adjacent commutator segments is reduced for a given size of machine or conversely the size of machine may be increased for a given induced voltage between adjacent commutator segments. It is well known to those skilled in the art that the resulting advantages will be either improved commutation for a given size of machine or an increased size of machine for a given degree of commutation, or both advantages in part may be had. It will be evident that although the commutation has been greatly improved there may be a certain amount of sparking because there still remain induced voltages between adjacent commutator segments caused by the working magnetic flux of the machine, various harmonic voltages in the machine and the self induced voltages in the coils short-circuited by the brushes due to the commutation process itself. It follows that additional means must be employed if it is desired to reduce these induced voltages and thereby further improve the commutation.

The following discussion will be of assistance in understanding the necessities for and the advantages of my invention. It is well known to those skilled in the art that in all dynamo electric machines having commutated windings the coil which is short-circuited by the brush is changed from one current path of the armature winding to another current path as the coil passes from one side of the brush to the other. In order to obtain sparkless commutation in a direct current and in a "single-phase" alternating current machine (more correctly called two-phase) the current in the coil short-circuited by the brush must reverse; that is, change 180 electrical degrees as it passes under the brush whereas in a "2-phase" alternating current machine (more correctly called 4-phase) the current must change 90 electrical degrees and in a 3-phase alternating current machine the current must change 120 electrical degrees. The current change in the short-circuited coil takes place rapidly, thus changing the strength of the magnetic flux in the core surrounded by the coil and this changing magnetic flux induces a counter-electromotive force in the coil that opposes the current reversal therein. The flux change is greatly decreased by the damping action of the remainder of the armature windings, other windings on the machine, eddy currents, etc., but some flux change remains. It is now evident that, since the coil is a part of another current path of the armature winding, the current from this other path can reach the brush either through the coil against its self-induced counter-electromotive force or as is usual in such cases the current forms an arc over the mica insulation between the commutator segments and reaches the brush without passing through the coil.

It is desirable to obtain sparkless commutation and hence nearly all dynamo electric machines having stationary brushes such as direct current machines and non-brush-shifting alternating current commutator machines employ interpole windings whose function it is to induce a voltage in the short-circuited coil which will balance the counter-electromotive force and leave a slightly reversed voltage in the coil to assist the current reversal therein. It is evident, therefore, that brush shifting motors can not employ interpole windings to improve commutation. The speed of the brush shifting alternating current commutator motor can be readily varied by shifting its brushes and it, therefore, becomes desirable to employ other means to further improve its commutation and thus broaden the usefulness of this motor. Various means have been proposed and used to improve its commutation, examples of such means being a series of resistances between the commutator segments to function as discharge resistances, and special windings to short-circuit individual teeth of the rotor, but these and similar means complicate the construction of the machine, increase its cost, and decrease its efficiency.

Multiplex windings are frequently used with equipotential connections to improve commutation. I have discovered that when such windings are used I can arrange them and their interconnections in such a manner that without the aid of any additional connections, resistances or windings, there will be internal paths having the effect of coils surrounding individual teeth in such a manner as to greatly improve commutation. It will be evident that my invention will equally apply to any dynamo electric machine having a commutated winding, but its greatest use will probably be in the alternating current brush shifting commutator motor since these motors can not employ interpole windings to improve commutation. My invention will be best understood from the following description when considered in connection with the accompanying drawings, while the features of my invention which are believed to be novel and patentable are pointed out in the claims appended hereto.

Fig. 1 represents a preferred embodiment of my invention as applied to a duplex winding, and Fig. 2 represents a preferred construction of the armature core and spider for carrying the equipotential leads.

Referring to Fig. 1, 10 represents a developed section of the commutator, comprising the segments 11, 12, 13, 14, 15 and 16 which are separated by suitable insulating material and 17 represents a brush resting on the segments 12 and 13, but it is to be understood that the machine employing this winding will have at least two brushes spaced at opposite polarity points on the commutator. For the specific embodiment of the invention shown in Fig. 1, each brush should have a width capable of bridging only two adjacent commutator segments during rotation of the commutator. Two developed sections of the magnetic armature core periphery are represented by 18 and 19. The section 18 has the peripheral slots 20, 21, 22 and 23, and the section 19 has the peripheral slots 28, 29 and 30. The intervening slots between the two sections have been omitted to simplify the drawings. Portions of two independent windings having equal pitches are shown, 31, 33 and 35 representing coils of one winding whereas 32, 34 and 36 represent coils of the other winding. Each coil consists of two slot conductors and four end connections. To facilitate the description of my invention I have numbered the slot conductors and end connections of the coils 32, 33 and 34. Thus the coil 32 consists of the slot conductors 37 and 38 and the end connections 39, 40, 41 and 42. The coil 33 consists of the slot conductors 43 and 44 and the end connections 45, 46, 47 and 48. The coil 34 consists of the slot conductors 49 and 50 and the end connections 51, 52, 53 and 54. Each slot conductor lies longitudinally in a core slot and the slot conductor ends nearest to the commutator are connected to those end connections that are connected to the commutator segments and the slot conductor ends opposite to the commutator are connected together by the other end connections to form the various coils. Thus, for example, slot conductors 37 and 38 have their ends nearest to the commutator connected to segments 11 and 13 by end connections 42 and 39 respectively, and the ends of 37 and 38 opposite to the commutator are connected together by end connections 41 and 40, thus forming coil 32. The equipotential leads 55, 56 and 57 connect the commutator segments 12, 14 and 16 to the middle points of the coils 32, 34 and 36 at the winding ends opposite the commutator. One of the armature core teeth is represented by 58 and ØT represents the magnetic flux in this tooth and for illustration the direction of this magnetic flux is shown by the arrow 59.

Inspection of Fig. 1 will show that the coils of both windings have the same winding pitch and that each core slot contains corresponding slot conductors from one coil of each winding, as for example, the slot 21 contains the corresponding slot conductors 43 and 49 of coils 33 and 34 and the slot 29 contains the other corresponding slot conductors 44 and 50 of the coils 33 and 34. The ends of the coils 32, 34 and 36 are connected to the alternate segments 11, 13 and 15 and the equipotential leads 55, 56, and 57 connect the middle points of these coils to the intervening segments 12, 14 and 16, and the voltage between adjacent commutator segments will correspond to the voltage induced in one-half of a coil. The ends of the coils 31, 33 and 35, are also connected to the intervening segments 12, 14 and 16, thus connecting equal potential points in the two windings, and insuring a uniform voltage gradient between adjacent commutator segments although this might be accompanied by a slight flow of equalizing current in the equipotential leads 55, 56 and 57. The brush 17 is in contact with the two commutator segments, thus short-circuiting one-half of a coil at a time. As previously described, these equipotential leads will reduce but not eliminate voltages tending to cause sparking at the brush 17, and additional means must be employed to reduce the induced voltage between adjacent commutator segments if it is desired to further reduce the sparking.

This is practically accomplished by means of my invention which consists of so arranging the independent windings and their interconnections that they function as the usual armature windings and at the same time provide a local short-circuiting path surrounding each armature core tooth. These short-circuit paths act as the secondaries of transformers the primaries of which are the conductors short-circuited by the brush 17. Thus, as shown in Fig. 1 for example, when the brush 17 rests on segments 12 and 13, the brush will short-circuit the slot conductor 38 through the end connections 39 and 40 and the equipotential lead 55, and this circuit acts as the primary of a transformer since the current in this slot conductor 38 reverses during commutation, thus changing the strength of the magnetic flux in the tooth 58 which acts as the magnetic core of the transformer. The short-circuited path which will act as the secondary of this transformer consists of the following circuit, slot conductor 38, end connection 40, equipotential lead 55, end connection 48, slot conductor 43, end connections 47 and 46, slot conductor 44, end connection 45, equipotential lead 56, end connection 53, slot conductor 49 and end connections 54 and 39, thus completing the circuit to the starting point. The direction of current flow in this secondary path at any instant may be illustrated for example by the arrows shown on its various portions. It is evident that the primary circuit is completed through the segments 12 and 13 and the brush 17 whereas the secondary circuit is always closed without the aid of commutator segments or brushes. It can be seen that the primary circuit forms a part of the secondary circuit so there really exists an auto-transformer in which the slot conductor 38 acts as the primary, the tooth 58 acts as the magnetic core and the slot conductors 38 and 44 act as the secondary since they are on opposite sides of the tooth 58 and the current flow in them is in opposite directions and hence they are inductively related to the tooth 58. The remainder of the secondary circuit is nearly non-inductive because the conductors 43 and 49 are in the same slot and the current flow through them and in the remaining adjacent conductors is in opposite directions.

The benefits to commutation resulting from these secondary paths may be described as follows: It is well known to those skilled in the art that the primary of a transformer draws a current from its source of supply to set up the magnetizing flux of the transformer and when the secondary circuit of the transformer is closed the current flow in the secondary tends to demagnetize the transformer and the primary must draw an increased current to maintain the magnetizing flux. It is evident that the current reversal in the described primary circuit of the armature winding tends to set up a magnetic flux in the tooth 58, thus inducing a voltage and resulting current flow in the described secondary circuit of the armature winding which in turn tends to neutralize the flux set up by the primary current. The primary current is limited by the value of the current in one of the armature paths and therefore the primary current cannot automatically increase to maintain this magnetic flux. The result is that only a small value of magnetic flux is set up in the tooth 58 by the primary current, thus greatly reducing the induced counter-electromotive force in the primary and greatly improving commutation. Similar action takes place at every brush on the commutator regardless of which two adjacent commutator segments the brush rests on as the commutator rotates.

It is evident however that the slot conductors carry the induced current in addition to the load current and the equipotential leads carry the induced current in addition to the possible equalizing current.

Examination of Fig. 2 of United States

Patent 1,739,445 will show that the effect of current carrying coils surrounding each tooth can not be obtained since such coils would contain two conductors carrying currents in opposite directions on each side of the tooth which causes their induced voltages to oppose and balance each other and thus no locally induced currents can flow in such coils.

Fig. 2 of my invention represents a preferred construction of the armature core and spider for carrying the equipotential leads. In Fig. 2 similar reference characters to those used in Fig. 1 represent one coil and one equipotential lead connected to the commutator. It is preferable to place the equipotential leads in openings of the spider 60 but if desired they may be carried in any suitable manner well known to those skilled in the art.

It will be readily appreciated by those skilled in the art that my invention will not only improve commutation in the above described manner but it will also have a strong tendency to suppress the objectionable high frequency harmonic voltages due to the passage of the rotor teeth past the stator slots, phase belts of windings, pitch effects, etc. This will tend to reduce the core losses which together with the reduction in losses at the brushes due to the practical elimination of sparking will greatly offset, or may even more than offset, the losses caused by the induced current flow in the local short-circuited paths surrounding each tooth.

The tendency to spark at the brushes will increase when the motor runs above synchronism with a high overload since a larger value of current is to be reversed in the coil short-circuited by the brush during a shorter time than with operation at normal load and lower speed. I have tested my invention by applying it to brush-shifting alternating current commutator motors without interpole windings and the commutation was highly satisfactory even with operation above synchronism and high overloads, whereas very unsatisfactory commutation resulted in the same motors with similar operation and the use of the ordinary balanced duplex winding.

It is evident that my invention can be used to improve commutation although the machine has interpole windings for this purpose. I have illustrated my invention in connection with a duplex winding arranged so that each local short-circuited path is inductively related to one tooth, but it will be obvious to those skilled in the art that my invention will equally apply to any multiplex winding arranged so that each local short-circuited path is inductively related to one or more than one tooth. Accordingly I wish it understood that my invention is not to be limited to the exact means shown and that such other modifications as fall within the true spirit and scope of my invention are intended to be included within the scope of the appended claims.

What I claim as new and desire to secure by Letters Patent of the United States, is:—

1. An armature for a dynamo electric machine comprising a magnetic core having a plurality of slots, a winding consisting of coils assembled in said slots, another winding consisting of coils assembled in said slots with the same winding pitch as the coils of the first mentioned winding, each of said coils containing at least two slot conductors, said coils being so arranged on said core that each slot contains the corresponding slot conductors of at least one coil from each winding, a commutator consisting of spaced segments with every other segment connected to the coil ends of the first mentioned winding and the intervening segments connected to the coil ends of the second mentioned winding and connecting means between the said intervening segments and the approximate centers of the coils of the first mentioned winding.

2. An armature for a dynamo electric machine comprising a magnetic core having a plurality of slots, a plurality of lap windings consisting of coils assembled in said slots with the same winding pitch, each of said coils containing at least two slot conductors, said coils being so arranged on said core that each slot contains the corresponding slot conductors of at least one coil from each of said windings, a commutator consisting of spaced segments with the corresponding slot conductors lying in a common slot connected to adjacent commutator segments, and connecting means between approximately equipotential points of the said windings.

3. An armature for a dynamo electric machine comprising a plurality of independent lap windings consisting of coils having the same winding pitch, each of said coils containing at least two slot conductors, a magnetic core having a plurality of slots with each slot containing corresponding slot conductors from at least one coil of each winding, a commutator consisting of spaced segments, means for connecting the corresponding slot conductors lying in common slots to adjacent commutator segments in the order in which said slots are located around said core, and means for individually connecting each alternate commutator segment to the approximate center of that coil whose ends are connected to commutator segments located on both sides of the respective alternate commutator segment.

4. An armature for a dynamo electric machine comprising a magnetic core having a plurality of slots, a plurality of independent lap windings consisting of coils having the same winding pitch assembled in said slots, each of said coils containing at least two slot conductors, said coils being so arranged on said core that each slot contains the corresponding slot conductors of at least one coil from each of said windings, a commutator consisting of spaced segments, means for connecting the corresponding slot conductors lying in a common slot to adjacent commutator segments in the order in which said slots are located around said core, brushes bearing on said commutator, each brush having a width capable of bridging only two adjacent commutator segments during operation of said dynamo electric machine, and connecting means between approximately equi-potential points of said windings.

5. An armature for a dynamo electric machine comprising a magnetic core having a plurality of slots, a lap winding consisting of a plurality of coils, a second lap winding consisting of a plurality of coils having the same winding pitch as the coils of the first mentioned winding, said coils being so arranged on said core that each pair of slots separated by a distance equal to the winding pitch of said coils contains one coil from each of said windings, a commutator consisting of spaced segments, means for connecting the ends of the coils of the first mentioned winding to alternate commutator segments in the order in which said coils of the first mentioned winding are located around said core, means for connecting the ends of the coils of the second mentioned winding to the intermediate commutator segments in the order in which said coils of the second mentioned winding are located around said core, means for individually connecting each intermediate commutator segment to the approximate center of that coil whose ends are connected to the segments adjacent to the respective intermediate segment, and brushes bearing on said commutator, each brush having a width capable of bridging only two commutator segments during operation of said dynamo electric machine.

In witness whereof, I have hereunto set my hand this 16th day of January, 1930.

JOHN I. HULL.